Oct. 26, 1954  E. L. MARTIN ET AL  2,692,739
LANDING GEAR LOCKING MECHANISM
Filed Sept. 25, 1951  2 Sheets-Sheet 1

Eric L. Martin
Francis Leighton
  INVENTORS

BY James M. Clark

THEIR PATENT ATTORNEY

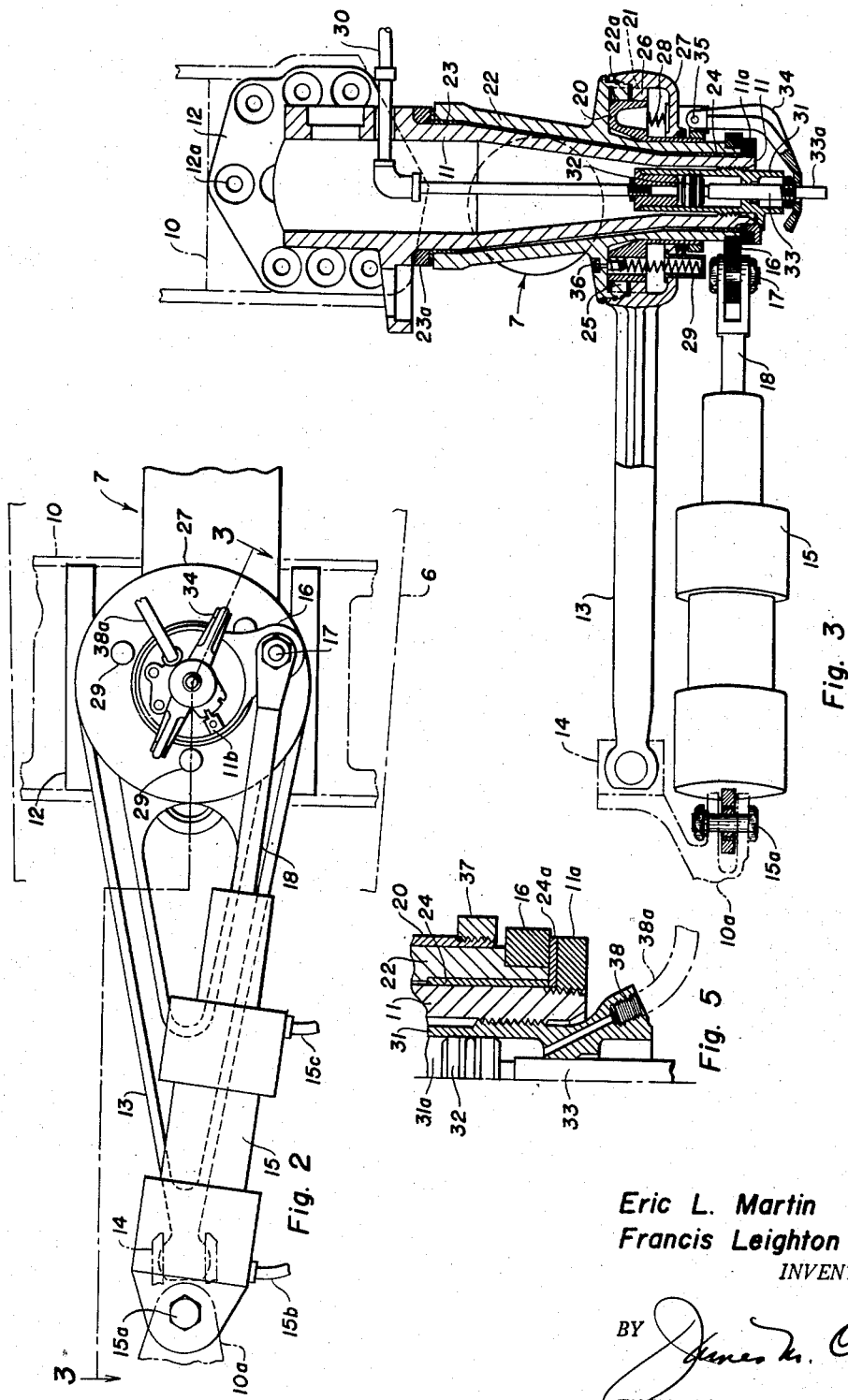

Patented Oct. 26, 1954

2,692,739

UNITED STATES PATENT OFFICE 2,692,739

LANDING GEAR LOCKING MECHANISM

Eric L. Martin, Santa Monica, and Francis Leighton, Altadena, Calif., assignors to North American Aviation, Inc.

Application September 25, 1951, Serial No. 248,208

11 Claims. (Cl. 244—102)

The present invention relates to the mounting and support of aircraft landing gears and more particularly to improved locking mechanism for retaining the landing gear in its operative position.

In the design of high speed jet aircraft having relatively thin sweptback wings it is necessary that the landing gear and its mounting structure be as sturdy and as compact as possible and that the mechanism for locking the gear in its extended operative position also be compact, simple and positive acting. Inasmuch as this type of aircraft generally dictates the use of a landing gear structure of the single cantilever shock-absorbing strut type, it becomes relatively more difficult to provide an adequate structural support for the cantilever strut and a compact down-lock mechanism of adequate strength to handle the high torque requirements within the minimum space provided by the relatively thin wing.

The present invention is directed to a solution of these problems by providing an arrangement wherein the cantilever shock-absorbing strut of the landing gear is arranged to rotate about a hollow central hinge pin member supported from the wing structure and extending rearwardly for retraction of the strut inwardly and laterally toward the fuselage about a substantially horizontal fore and aft axis. The landing gear is retained in its extended operative position by an improved landing gear locking mechanism comprising a pair of inter-engaging gear plates, or sets of splines, one of which is rotatable with the landing gear assembly about the central pin member, and the other gear plate or spline set is arranged to slide axially under the influence of hydraulic pressure but to be restrained rotatively about the axis of the central pin member. The sliding locking ring splined member is axially displaceable, against a set of compression springs which urge the member into its locking position, by a hydraulic piston actuator contained within the hollow central pin member to effect disengagement of the splines or gear teeth when it is desired to rotate the landing gear between its extended and retracted positions.

It is accordingly a major object of the present invention to provide an improved landing gear arrangement which is particularly adapted for high speed jet aircraft having relatively thin sweptback wings. A further object resides in the provision of an improved mounting means for a single cantilever strut type landing gear for lateral retraction about a longitudinal axis supported within the wing structure. It is a further object of this invention to provide improved down-lock mechanism for this and similar type landing gears, which locking mechanism is compact, simple and positive-acting and is capable of handling high torque requirements within the minimum space provided by relatively thin wings. A still further object of the present invention resides in the provision of a hydraulically actuated intermeshing gear or spline type lock which is mounted co-axially about the hinge axis about which the landing gear rotates between its retracted and extended positions. It is a further object to provide such a landing gear which is also actuated between its extended and retracted positions by a hydraulic or fluid motor supplied by the same fluid pressure system to thereby simplify the sequence control of the locking and unlocking fluid motors, and the retracting motor. It is a further object to provide in such a mechanism improved pin means for preventing the down-gear lock from locking in any position other than when the landing gear is fully down in its extended position. A further object resides in the provision of a retractable landing gear installation which requires no emergency gear lowering system but which allows the gear to fall free into the down and locked position upon mechanically releasing the up-lock or hook mechanism.

Other objects and advantages of the present invention will become apparent to those skilled in the art after reading the present specification and the following drawings, forming a part hereof, in which:

Fig. 2 is an enlarged rear elevational view of the upper mounting portion of the landing gear shown in Fig. 1 with the landing gear shown in the retracted position;

Fig. 3 is a sectional plan view of the structure and mechanism shown in Fig. 2 as taken along the lines 3—3 thereof but with the landing gear shown in the extended position;

Fig. 5 is a similar fragmentary view of a portion of the mechanism shown in Fig. 4 in a rotated position.

Figure 1:
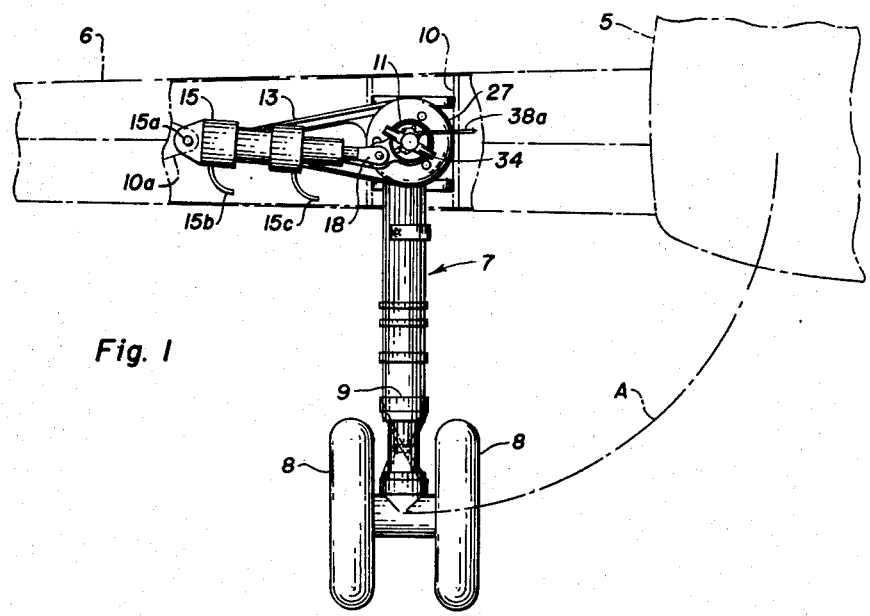
Fig. 1 is a rear elevational view of an aircraft looking forward toward the landing gear to which the present invention has been applied.

Referring now to Fig. 1 the numeral 5 represents a portion of the fuselage of an aircraft from which there is extended laterally a wing 6. A cantilever type landing gear strut 7, provided with a pair of landing wheels 8, is rotatively mounted upon the wing structure 10 for lateral inward retraction along the arcuate path indicated by the construction lines A. The landing gear is indicated in this figure in its loaded position with the aircraft upon the ground such that the piston portion is telescoped to some extent within the strut cylinder 7 and a suitable torque scissors 7 is provided to prevent relative rotation between the piston and cylinder portions in order that the forward alignment of the wheels 8 may be maintained. The landing gear assembly is arranged to rotate upon the fore and aft horizontal axis of a hollow conical pin or hinge member 11 which is secured to the internal wing structure at 10 by the support fitting 12 and the attachment bolts 12a. As more particularly shown in Figs. 2 and 3, the forward outer end of the landing gear assembly is stabilized by means of the lock arm 13 which is secured to the internal wing structure at 14. A hydraulic actuating cylinder 15 is provided for rotating the landing gear assembly 7 between its up and down positions by means of the short lever arm 16 pivotally attached at 17 to the piston rod 18 of the actuator cylinder 15. The latter is pivotally mounted by means of the pivot pin 15a to the internal wing structure 10a and is also provided with suitable connections 15b and 15c through which hydraulic fluid may be selectively controlled for extension and retraction of its piston 18.

The landing gear assembly 7 is retained in the extended position of Fig. 1 by means of a locking ring or collar assembly 20 having a plurality of male splines or detents 21 in the form of a gear plate disposed about its upper outer periphery. The locking ring 20 is slidable axially along a cylindrical portion of a trunnion member 22. The landing gear assembly 7 is fixedly attached to and supported through the trunnion member 22 which is arranged for rotation upon the inner and outer bearings 23 and 24, respectively, upon the fixed support member 11, backed by the ring 23a. A series of female splines, detents or internal gear teeth 25, integrally formed within the trunnion member 22, match and are meshable with the series of male splines 21 upon the locking ring 20. A similar series of female splines or gear teeth 26 is formed within the annular portion 27 which is integral with the locking arm member 13 and encircles the landing gear support assembly. The splines of the locking ring collar 20 engage the splines 25 and 26 to thereby effect a retention of the landing gear in the extended position through this inter-meshing or inter-engagement thereby locking members 22 and 27 together. Inasmuch as the lock arm or stabilizer 13 and its annular portion 27 are relatively fixed and the trunnion member 22 rotates within the annular portion 27, suitable retaining means in the form of the ring 22a is provided between these two portions to prevent axial separation of the members 22 and 27. A plurality of compression springs 28 are carried by the annular portion 27, each spring being contained within a housing 29 for the purpose of urging the locking ring collar 20 and its splines 21 forwardly into engagement with the splines 25 of the rotatable trunnion member 22.

In order to unlock the landing gear to effect its retraction, hydraulic fluid, under pressure which may be of the order of 3000 p. s. i., is admitted through the tubing 30 and the connecting piping which passes axially of the landing gear mounting structure or centrally of the hollow hinge pin member 11, the fluid entering the chamber 31a within the cylinder 31 within which the piston 32 is reciprocable. The piston 32 has fixedly attached thereto the piston rod 33 which extends outwardly through the guide bore at the head end of the cylinder 31, the lower chamber being vented at 38 and 38a. The piston rod 33 has a reduced diameter outer portion 33a which extends through a central opening in the double arm yoke 34 and at the shouldered portion of piston rod 33 there is threadedly attached an actuator nut 33b which engages an opening in the central portion of the yoke 34. The terminals of the arms of the yoke 34 are pivotally attached by the pivot pins 35 to the yoke ring fitting 37 which is threadedly attached to the cylindrical barrel or collar portion of the locking ring member 20, a suitable seal 27a being provided where this collar portion of the locking ring 20 slides within the opening in the annular member 27 to prevent the entrance of dirt, or the leakage of lubricant from the spline chamber. It will accordingly be understood that as hydraulic fluid is forced under pressure through the tubing 30 into the cylinder 31a the piston is moved outwardly or rearwardly such that the nut 33b on the piston rod 33 forces the yoke 34 in the same direction and draws the locking ring collar assembly 20 outwardly against the opposition of the compression springs 28, to thereby disengage the splines 21 on the locking ring 20 from the splines 25 on the trunnion portion 22. With the locking means so disengaged the landing gear strut 7 can be rotated to its retracted position by extension of the piston rod 18 of the actuating cylinder 15, imparting counter-clockwise rotation to the lever arm 16 such that it is moved from the extended position shown in Fig. 1, to the retracted position shown in Fig. 2.

A conventional latch type up-lock is preferably employed for retaining the landing gear assembly 7 in its up position and suitable release mechanism may also be provided for releasing the up-lock when it is desired to extend the landing gear. Inasmuch as such up-lock mechanism is conventional and forms no part of the present invention, it has not been shown in the drawings. A plurality of index or locating pins 36 are provided in the shock strut gear plate 22 to prevent engagement of the splines 21 and 25 at any other than the fully extended operative position shown in Fig. 4. In this position, the fluid pressure has been applied for unlocking the splines and when this pressure is released the locking ring 20 moves inwardly such that the locking pins 36 are permitted to enter the aligned mating holes 20a in the locking ring 20, only when the strut assembly has been rotated to the proper position. In the event the locking pressure is released within the fluid line 30 at other than this position the pins 36 will bear upon the plain end surface of the locking collar 20 and prevent engagement of the splines 21 with the splines 25 until the gear has been extended fully and the index pins 36 aligned with the mating holes 20a. It will also be understood that a similar detent or spline, and index pin arrangement may be employed for locking the gear in the up-position by appropriate modification of the present device in substitution for the conventional up-lock mechanism described above.

Figure 4:
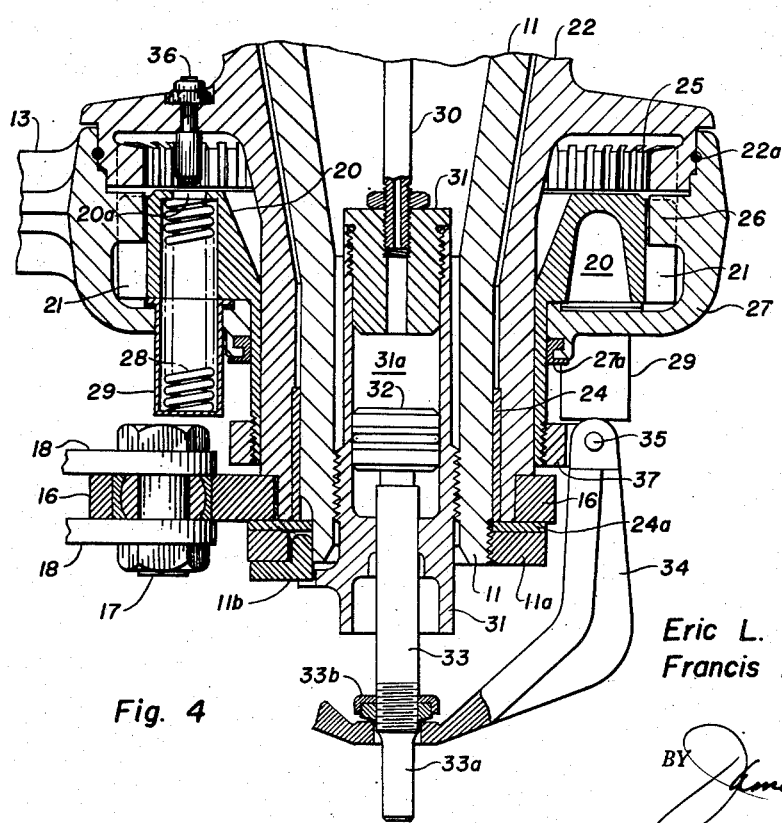
Fig. 4 is an enlarged sectional view of a portion of the mechanism shown in Fig. 3.

Referring more particularly to Figs. 4 and 5, which show the details at the end of the mounting, it will be noted that the short lever arm 16 is fixedly mounted upon the strut trunnion member 22 to which it imparts rotation between the retracted and extended positions. The lever arm 16 is pivotally connected to the actuating piston 18 by the pivot 17 for the purposes of extension and retraction of the gear and is retained upon the outer end of the trunnion member 22 by means of the retainer ring 11a which threadedly engages the end of the fixed mounting pin 11, with the bearing washer 24a disposed between the lever arm 16 and the retaining ring 11a to supplement the plain bearing 24 with thrust characteristics in the axial direction. The retaining ring 11a is additionally locked or keyed to the fixed pin member 11 by the retaining element 11b engaging a keyway in the end of the pin member 11 and also engaged in a slot in the outer portion of the cylinder casing 31, which in turn is threaded into the reduced diameter bore adjacent the extremity of the fixed pin member 11.

It will accordingly be noted that the disclosed mechanism provides a compact down-lock arrangement as well as a sturdy pivotal support for a cantilever landing gear strut wherein high torque loads can be met within a minimum amount of space necessary for housing the actuating mechanism and supporting structure. It will also be appreciated that the disclosed mechanism is particularly adapted for thin wing sections where conventional brace or latch pin types of gears are not well fitted. In the disclosed installation, there is no requirement of an emergency gear lowering hydraulic system, as the gear up-locks may be mechanically released allowing the gear to free-fall into the down and locked position.

Other forms and modifications of the present invention, both with respect to its general arrangement and the details of its respective components, which become apparent to those skilled in the art after reading the present description are intended to come within the scope and spirit of this invention as more particularly defined in the appended claims.

We claim:

1. In an aircraft, a retractable landing gear comprising a member fixedly supported from the aircraft, a rotatable member journalled upon said fixed member, actuating means mounted on the aircraft in spaced relation to the fixed member, a force transmitting linkage extending from the actuating means to operative connection with the rotatable member whereby the actuating means is adapted for rotating said rotatable member between retracted and extended positions, detent means carried by said rotatable member, a second fixed member embracing said rotatable member, second detent means carried by said second fixed member alignable with the detent means of said rotatable member, a slidable collar member having toothed means slidably engaged with the detent means of said second fixed member, said collar member being axially slidable along said rotatable member for engagement of its toothed means with the detent means of said rotatable member for locking the same to said second fixed member, and means operatively connected to the collar member adapted for axially moving said collar member between its engaged and disengaged positions for the locking and unlocking of said landing gear.

2. In an aircraft having a retractable landing gear, a hinge member fixedly supported from the aircraft, a rotatable member journalled upon said fixed hinge member, a landing gear strut fixed to said rotatable member, actuating means connected to the rotatable member at a point spaced outwardly from the rotational axis thereof and organized to deliver an operating force thereto for rotating said rotatable member between retracted and extended positions, detent means carried by said rotatable member, a second fixed member embracing said rotatable member, second detent means carried by said second fixed member alignable with the detent means of said rotatable member, a slidable collar member having toothed means slidably engaged with the detent means of said second fixed member, said collar member being axially slidable along said rotatable member for engagement of its toothed means with the detent means of said rotatable member for locking the same to said second fixed member, and means operatively connected to the collar member for axially moving said collar member between its engaged and disengaged positions for the locking and unlocking of said landing gear strut with respect to the aircraft.

3. In a retractable landing gear for aircraft, landing gear supporting means adapted to be fixedly attached to aircraft structure, a member rotatably mounted upon said supporting means, a landing gear strut fixed to said rotatable member, actuating means for rotating said rotatable member, an operative connection extending between said actuating means and said rotatable member adapted to actuate the rotatable member between retracted and extended positions of the landing gear, detent means comprising an annular series of radially projecting splines carried by said rotatable member, said supporting means having a fixed portion embracing said rotatable member, said fixed embracing portion having detent means comprising a second annular series of spindles projecting in the same direction as the first said series alignable with the detent means of said rotatable member, a collar member having detents comprising a third annular series of splines projecting in an opposite radial direction to the first two series of splines slidably engaged with the detent means of said fixed embracing portion, said collar member being axially slidable with respect to said rotatable member for engagement of its detents with the detent means of said rotatable member for locking the same to said fixed supporting means, and means including a fluid actuated piston with operative connection to the collar member adapted for axially moving said collar member between its engaged and disengaged positions for the locking and unlocking of said landing gear.

4. In an aircraft, a retractable landing gear comprising a hinge member fixedly supported from the aircraft, a tubular rotatable member journalled upon said hinge member, a landing gear strut supported from said rotatable member, actuating means extending from support upon the aircraft and having operative connection to the rotatable member adapted for rotating said rotatable member between retracted and extended positions of the landing gear, a plurality of female splines carried by said rotatable member, a fixed member embracing said rotatable member having a plurality of female splines alignable with the splines of said rotatable member, a collar member having a plurality of male splines engaged continuously with the female splines of said fixed member, said collar member being axially slidable along said rotatable member for engagement of its male splines with the female splines of said rotatable member for locking the same to said fixed member, hydraulic means adapted for axially moving said collar member between its engaged and disengaged positions for the locking and unlocking of said landing gear, and resilient means urging said collar member into said locking position.

5. In a retractable landing gear for aircraft, landing gear supporting means adapted to be fixedly attached to an aircraft, a member rotatably mounted upon said supporting means, actuating means for rotating said rotatable member between retracted and extended positions of the landing gear, the said actuating means having an operative connection to the landing gear whereby it is adapted to impart rotational movements thereto, detent means carried by said rotatable member, said supporting means having a fixed portion embracing said rotatable member, said fixed embracing portion having detent means disposed adjacent the detent means of said rotatable member, the detent means of said rotatable member alignable with the detent means of said fixed embracing portion in the extended position of said landing gear, a collar member having detents slidably engaged with the detent means of said fixed embracing portion, said collar member being axially slidable along said rotatable member for engagement of its detents with the detent means of said rotatable member for locking the same to said fixed supporting means in the said extended position of said landing gear, means including a fluid-actuated piston for axially moving said collar member between its engaged and disengaged positions for the locking and unlocking of said landing gear, and a force transmitting connection extending from the fluid actuated piston to the collar member.

6. In an aircraft, a retractable landing gear for ground support of said aircraft, including landing gear supporting means fixedly attached to the aircraft, a member rotatably mounted upon said supporting means, actuating means carried by said aircraft, a force transmitting connection extending from the actuating means to provide an operating linkage for rotating said rotatable member between retracted and extended positions of the landing gear, detent means carried by said rotatable member, said supporting means having a fixed portion embracing said rotatable member, said fixed embracing portion having detent means alignable with the detent means of said rotatable member, a collar member having detents slidably engaged with the detent means of said fixed embracing portion, said collar member being axially slidable along said rotatable member for engagement of its detents with the detent means of said rotatable member for locking the same to said fixed supporting means, a cylinder formed within said fixed supporting means, and means including a fluid-actuated piston reciprocable within said cylinder for axially moving said collar member between its engaged and disengaged positions for the locking and unlocking of said landing gear, and an operating connection extending from said piston to the said collar member.

7. In a retractable landing gear for aircraft, landing gear supporting means adapted to be fixedly attached to aircraft structure, a member rotatably mounted upon said supporting means, a landing gear strut fixed to said rotatable member, actuating means for rotating said rotatable member connected thereto to cause movement between retracted and extended positions of the landing gear, detent means carried by said rotatable member, said supporting means having a fixed portion embracing said rotatable member, said fixed embracing portion having detent means alignable with the detent means of said rotatable member, a collar member having detents slidably engaged with the detent means of said fixed embracing portion, said collar member being axially slidable along said rotatable member for engagement of its detents with the detent means of said rotatable member for locking the same to said fixed supporting means, means including a fluid actuated piston for axially moving said collar member between its engaged and disengaged positions for the locking and unlocking of said landing gear, an operative connection between the piston and the collar member and resilient means arranged to urge said collar member into said engaged position.

8. In a retractable landing gear for aircraft, landing gear supporting means adapted to be fixedly attached to an aircraft, a member rotatably mounted upon said supporting means, a landing gear strut fixed to said rotatable member, actuating means for rotating said rotatable member between retracted and extended limit positions of the landing gear, the said actuating means having an operative connection to the rotatable member through which such rotation is accomplished, detent means carried by said rotatable member, said supporting means having a fixed portion embracing said rotatable member, said fixed embracing portion having detent means alignable with the detent means of said rotatable member, a collar member having detents slidably engaged with the detent means of said fixed embracing portion, said collar member being axially slidable along said rotatable member for engagement of its detents with the detent means of said rotatable member for locking the same to said fixed supporting means, means including a fluid piston with operative connection to the collar member for axially moving said collar member between its engaged and disengaged positions for the locking and unlocking of said landing gear, and spring-biased pin means being slidably mounted within said rotatable member for preventing engagement of said collar member detent means with said rotatable member at other than a limit position of said landing gear.

9. In an aircraft, a fixed member supported from the aircraft to provide a journal for a retractable landing gear, a member rotatable about an axis extending longitudinally through the fixed member, a landing gear strut fixed to the rotatable member, mechanism for locking the landing gear in a terminal position, a first actuating means supported from the aircraft's structure adapted to apply a moment of force acting tangentially about the axis to cause movement of the landing gear between extended and retracted positions, a second actuating means supported upon the fixed member adapted to apply an actuating force acting in direction parallel to the axis to cause movement of the locking mechanism, the said first actuating means including an operating linkage terminating in an operative connection with the rotatable member at a point offset from the axis, and the said second actuating means including a shiftable locking member slidably and rotatably mounted upon the rotatable member, rotation preventing means extending from the aircraft's structure to engage the shiftable locking member, the connection between the rotation preventing means and the shiftable locking member being adapted to prevent rotational movement of the shiftable locking member, an operating linkage extending from the second actuating means terminating in an operative connection on the shiftable locking member, and locking means having cooperable elements formed respectively on the rotatable member and on the shiftable locking member adapted to be interengaged upon movement of the shiftable locking member by the associated second actuating means.

10. In an aircraft, a retractable landing gear comprising landing gear supporting means fixedly attached to the aircraft, a member rotatably mounted upon said supporting means, actuating means connected to the rotatable member and thereby adapted to deliver an operating force thereto for rotating said rotatable member between retracted and extended positions of the landing gear, detent means comprising an annular series of radially projecting splines carried by said rotatable member, said supporting means having a fixed portion embracing said rotatable member, said fixed embracing portion having detent means comprising a second annular series of splines projecting in the same direction as the first said series alignable with the detent means of said rotatable member, a collar member having detents comprising a third annular series of splines projecting in an opposite radial direction to the first two series of splines adapted to be slidably engaged with the detent means of said fixed embracing portion, said collar member being axially slidable to cause engagement of its detents with the detent means of said rotatable member for locking the same to said fixed supporting means and means operatively associated with the collar member providing a force for axially moving said collar member between its engaged and disengaged positions for the locking and unlocking of said landing gear.

11. In an aircraft having a retractable landing gear, a hinge member fixedly supported from the aircraft, a tubular rotatable member journalled upon said hinge member, actuating means connected to the tubular rotatable member for rotating said rotatable member between retracted and extended positions of the landing gear, a plurality of splines arranged in an annular series of inwardly projecting elements carried by said rotatable member, a fixed member embracing said rotatable member having a plurality of similar splines alignable with the splines of said rotatable member, a collar member having a plurality of splines arranged in an annular series of outwardly projecting elements engaged with the splines of said fixed member, said collar member being axially slidable along said rotatable member for engagement of its splines with the splines of said rotatable member for locking the same to said fixed member, and hydraulic means extending into operative engagement with and being adapted for axially moving said collar member between its engaged and disengaged positions for the locking and unlocking of said landing gear.

References Cited in the file of this patent

UNITED STATES PATENTS

| Number | Name | Date |
|---|---|---|
| 1,550,550 | McCauley | Aug. 18, 1925 |
| 2,166,653 | Austin | July 18, 1939 |
| 2,296,117 | Pevney | Sept. 15, 1942 |
| 2,373,385 | Davie | Apr. 10, 1945 |
| 2,391,998 | Palmer | Jan. 1, 1946 |

FOREIGN PATENTS

| Number | Country | Date |
|---|---|---|
| 981,984 | France | Jan. 24, 1951 |